United States Patent
Park

(10) Patent No.: US 7,483,588 B2
(45) Date of Patent: Jan. 27, 2009

(54) METHOD AND APPARATUS FOR ENCODING AND DECODING AN ICOSAHEDRON PANORAMA IMAGE

(75) Inventor: Gwang-Hoon Park, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 707 days.

(21) Appl. No.: 11/201,206

(22) Filed: Aug. 11, 2005

(65) Prior Publication Data

US 2006/0034523 A1 Feb. 16, 2006

(30) Foreign Application Priority Data

Aug. 13, 2004 (KR) .............. 10-2004-0063885
Aug. 9, 2005 (KR) .............. 10-2005-0072966

(51) Int. Cl.
*G06K 9/36* (2006.01)

(52) U.S. Cl. ............... 382/276; 382/233; 382/243; 382/284; 348/36; 348/39

(58) Field of Classification Search ............... 382/233, 382/235, 243, 274, 275; 358/3.26, 3.27, 358/463
See application file for complete search history.

(56) References Cited

U.S. PATENT DOCUMENTS

| 5,694,331 | A | * | 12/1997 | Yamamoto et al. ......... 345/428 |
| 6,144,773 | A | * | 11/2000 | Kolarov et al. ............. 382/240 |
| 6,556,198 | B1 | * | 4/2003 | Nishikawa ................. 345/420 |
| 6,923,444 | B2 | * | 8/2005 | Matos ....................... 273/153 S |
| 6,961,064 | B2 | * | 11/2005 | Bushey ...................... 345/546 |

OTHER PUBLICATIONS

Gregory, A.; State, A; Lin, M.C.; Manocha, D.; Livingston, M.A.; "Feature-based surface decomposition for correspondence and morphing between polyhedra"; Computer Animation 98 Proceedings, Jun. 8-10, 1998 pp. 64-71.
Rossignac, J.; "Edgebreaker: connectivity compression for triangle meshes"; Visualization and Computer Graphics, IEEE Transactions on vol. 5, Issue 1, Jan.-Mar. 1999 pp. 47-61.
Pajarola, R.; Rossignac, J.; "Compressed progressive meshes"; Visualization and Computer Graphics, IEEE Transactions on, vol. 6, Issue 1, Jan.-Mar. 2000 pp. 79-93.
Chao-Hung Lin; Tong-Yee Lee; "Metamorphosis of 3D Polyhedral Models Using Progressive Connectivity Transformations" Visualization and Computer Graphics, IEEE Transactions on vol. 11, Issue 1, Jan.-Feb. 2005 pp. 2-12.
Kubola, K.; Chu, H.; "Connectivity compression for three-dimensional planar triangle meshes", Information Visualisation, 2005. Proceedings. Ninth International Conference on Jul. 6-8, 2005 pp. 837-841.

* cited by examiner

*Primary Examiner*—Yosef Kassa
(74) *Attorney, Agent, or Firm*—Roylance, Abrams, Berdo & Goodman, LLP

(57) ABSTRACT

A method of and apparatus for efficient encoding and decoding by reconstructing an icosahedron panorama image are provided. The method includes: dividing patches forming a top part and a bottom part, respectively, in development figure of an icosahedron panorama image, from patches forming a middle part; reconstructing the divided patches on a 2-dimensional plane so that patches having a high correlation are placed adjacent to each other; and encoding the reconstructed patches.

31 Claims, 8 Drawing Sheets

DUMMY

DUMMY

METHOD AND APPARATUS FOR ENCODING AND DECODING AN ICOSAHEDRON PANORAMA IMAGE

CROSS-REFERENCE TO RELATED PATENT APPLICATIONS

This application claims the benefit under 35 U.S.C. 119(a) of Korean Patent Application No. 10-2004-0063885, filed in the Korean Intellectual Property Office on Aug. 13, 2004, and Korean Patent Application No. 10-2005-0072966, filed in the Korean Intellectual Property Office on Aug. 9, 2005, the entire contents of which are hereby incorporated by reference.

BACKGROUND OF THE INVENTION

1. Field of the Invention

The present invention relates to encoding and decoding of moving pictures. More particularly, the present invention relates to a method of and apparatus for efficiently performing encoding and decoding by reconstructing patches of an icosahedron panorama moving picture.

2. Description of the Related Art

An omni-directional video camera system is a camera system that is capable of taking 360-degree omni-directional images from a fixed viewpoint. The omni-directional video camera system takes omni-directional images by mounting and using a special shape mirror such as a hyperboloid mirror, a special lens such as a fish eye lens, or by using a plurality of cameras.

A 3-dimensional realistic broadcasting system is presented as an example of an omni-directional video coding applications for use with such a system. In the 3-dimensional realistic broadcasting system, all image information on views from various viewpoints in a baseball game and the like, for example, is provided to viewer terminals. That is, a variety of image information items, including the view from the pitcher, the view from the catcher, the view from the batter, the view from the audience sitting near first base, are provided to the viewers. Viewers can select a desired viewpoint and view the image from that viewpoint.

An image photographed by the omni-directional camera system has a characteristic corresponding to a 3-dimensional spherical environment. Accordingly, a 3-dimensional image taken by the omni-directional camera system is converted into a 2-dimensional plane image. At this time, the 2-dimensional plane image becomes a panorama image containing the omni-directional image. Omni-directional video coding is performed for the 2-dimensional panorama image.

Generally, the panorama image has a size much larger than that of a conventional 2-dimensional image, and in order to transmit a quality image, requires an excessively large bandwidth. Accordingly, it is very important to efficiently code the image.

Research on a variety of methods for processing the omni-directional image is currently being conducted. In particular, when an icosahedron image is applied to video coding, the developed or resulting figure is formed using 20 equilateral-triangle-shaped patch images, as shown in FIG. 1, and matches relatively accurately with a sphere. Accordingly, the panorama image processing has become a popular research area.

FIG. 2 illustrates a conventional method of coding an icosahedron panorama image. First, a boundary line such as a rectangle marked with dotted lines for an icosahedron is set, and macroblocks are arranged to include all of the boundary line. Then, the icosahedron panorama image is coded in units of blocks.

Black colored blocks are blocks outside the icosahedron having no image information. When encoding and decoding are performed, a skip operation is performed for the black colored blocks.

White colored blocks are blocks inside the icosahedron that are coded using a conventional frame unit coding method. However, gray colored blocks are located on the boundaries of respective patches, and if the conventional frame unit coding technique is used, a lot of high frequency components occur on the boundary such that the coding efficiency is quickly degraded.

For example, in order to process the icosahedron panorama image of FIG. 2, a total of 288 macroblocks comprising 24 blocks in width and 12 blocks in length should be processed, and among them, 109 macroblocks on the boundary part should be processed, which means that low efficiency coding is performed in 38% of the macroblocks. For example, in order to process patches 1, 5, 9, 13, and 17 of the top part, 47 macroblocks out of a total of 96 macroblocks are on the boundary part, which means that low efficiency coding is performed in about 49% of the macroblock on the top part.

Therefore, a need exists for an apparatus and method of efficiently processing an icosahedron panorama image. Specifically, a need exists for efficiently processing the macroblocks of an icosahedron panorama image.

SUMMARY OF THE INVENTION

The present invention substantially solves the above and other problems, and provides an apparatus for and method of enabling a higher moving picture coding efficiency by reconstructing patches so that the number of boundary macroblocks having a high probability of degrading a coding efficiency can be reduced.

According to an exemplary aspect of the present invention, a method is provided of encoding an icosahedron panorama image formed with 20 equilateral triangular patches. The method comprises dividing patches forming a top part and a bottom part, respectively, of the development figure of the icosahedron panorama image, from patches forming a middle part, reconstructing the divided patches on a 2-dimensional plane such that patches having a high correlation are disposed adjacent to each other, and encoding the reconstructed patches.

In reconstructing the patches, the 5 patches forming the top part may be reconstructed on a 2-dimensional plane such that among 5 sides shared in the icosahedron in a 3-dimensional space, 4 sides are shared.

In two patches each sharing only one side with another patch as the result of the reconstruction, the method may further comprise copying part of each of two patches and generating one equilateral triangle patch out of the copied parts such that the side that are shared in the icosahedron in the 3-dimensional space and are not shared in the reconstruction result are included, and inserting the generated patch between the patches reconstructed on the 2-dimensional plane such that 5 sides are shared in the same manner as in the icosahedron of the 3-dimensional space. This method is applied to the bottom part in the same manner.

Meanwhile, in the development figure of the middle part, the right part of the patch in the rightmost end may be copied and inserted such that the part shares one side with the patch in the leftmost end, and the left part of the patch in the leftmost end may be copied and inserted such that the part shares one side with the patch in the rightmost end.

According to another exemplary aspect of the present invention, an apparatus is provided for encoding an icosahedron panorama image formed with 20 equilateral triangular patches. The apparatus comprises an image division unit for dividing patches forming a top part and a bottom part, respectively, of the development figure of the icosahedron panorama image, from patches forming a middle part, an image reconstruction unit for reconstructing the patches divided by the image division unit on a 2-dimensional plane such that patches having a high correlation are disposed adjacent to each other, and an image encoding unit for encoding the reconstructed patches.

The image reconstruction unit may reconstruct the 5 patches forming the top part on a 2-dimensional plane such that among 5 sides shared in the icosahedron in a 3-dimensional space, 4 sides are shared.

In two patches each sharing only one side with another patch as the result of the reconstruction, the image reconstruction unit may copy part of each of two patches, generate one equilateral triangle patch out of the copied parts such that the side that are shared in the icosahedron in the 3-dimensional space and are not shared in the reconstruction result are included, and insert the generated patch between the patches reconstructed on the 2-dimensional plane such that 5 boundary surfaces are shared in the same manner as in the icosahedron of the 3-dimensional space. This method is applied to the bottom part in the same manner.

Meanwhile, in the development figure of the middle part, the image reconstruction unit may copy and insert the right part of the patch in the rightmost end such that the part shares one side with the patch in the leftmost end, and copy and insert the left part of the patch in the leftmost end such that the part shares one side with the patch in the rightmost end.

According to still another exemplary aspect of the present invention, a method is provided of decoding an icosahedron panorama image formed with 20 equilateral triangular patches. The method comprises receiving and decoding a stream obtained by encoding patches reconstructed such that patches having a high correlation are disposed adjacent to each other; restoring the patches generated as the result of the decoding, into a shape prior to the reconstruction, combining the restored reconstructed patches; and generating the development figure of the icosahedron.

According to yet still another exemplary aspect of the present invention, an apparatus is provided for decoding an icosahedron panorama image formed with 20 equilateral triangular patches. The apparatus comprises an image decoding unit for receiving and decoding a stream obtained by encoding patches reconstructed such that patches having a high correlation are disposed adjacent to each other, an image restoration unit for restoring the patches generated as the result of the decoding, into a shape prior to the reconstruction; and an image combining unit for generating the development figure of the icosahedron, by combining the restored reconstructed patches.

According to a further exemplary aspect of the present invention, a computer readable recording medium is provided having embodied thereon instructions for executing a method of encoding an icosahedron panorama image formed with 20 equilateral triangular patches. The computer readable recording medium comprises a first set of instructions for dividing patches forming a top part and a bottom part, respectively, of the development figure of the icosahedron panorama image, from patches forming a middle part, a second set of instructions for reconstructing the divided patches on a 2-dimensional plane such that patches having a high correlation are disposed adjacent to each other, and a third set of instructions for encoding the reconstructed patches.

According to an additional exemplary aspect of the present invention, there is provided a computer readable recording medium having embodied thereon instructions for executing a method of decoding an icosahedron panorama image formed with 20 equilateral triangular patches. The computer readable recording medium comprises a first set of instructions for receiving and decoding a stream obtained by encoding patches reconstructed such that patches having a high correlation are disposed adjacent to each other, a second set of instructions for restoring the patches generated as a result of the decoding, into the shape prior to the reconstruction, and a third set of instructions for combining the restored reconstructed patches to generate the development figure of the icosahedron.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numerals will be understood to refer to like parts, components and structures.

DETAILED DESCRIPTION OF EXEMPLARY EMBODIMENTS

Exemplary embodiments of the present invention will now be described more fully with reference to the accompanying drawings.

Figure 1:
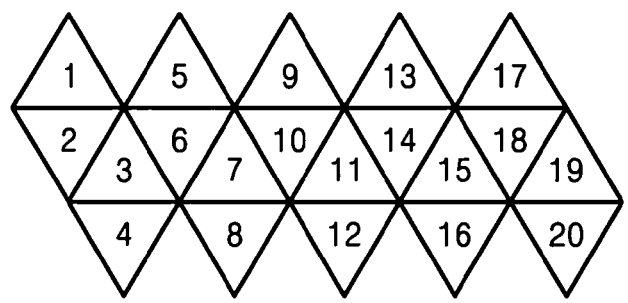
FIG. 1 is a conventional development figure of an icosahedron panorama image.
Figure 3:
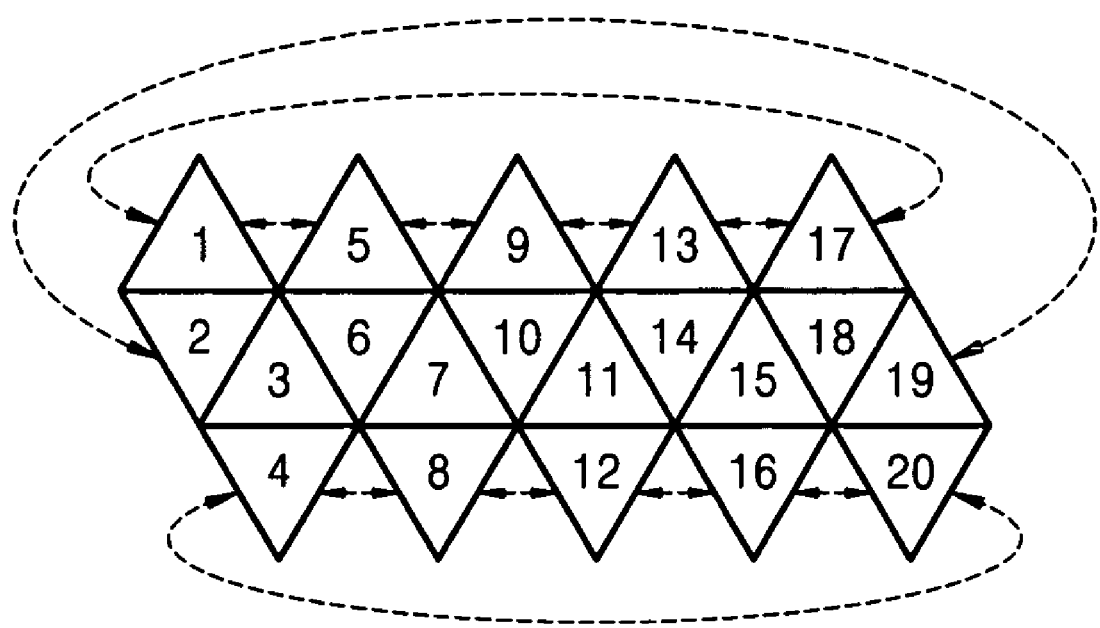
FIG. 3 illustrates spatial correlations of equilateral patches of an icosahedron panorama image.

As shown in the icosahedron panorama image of FIG. 3, patches 1, 5, 9, 13, and 17 on the top part, patches 4, 8, 12, 16, and 20 on the bottom part, and patches 2 and 19 on the middle part are connected to each other when the icosahedron is formed. Accordingly, there are high spatial correlations among the parts. However if the conventional technology is used, the patches are coded in the form of the development figure of the icosahedron as shown in FIG. 1 without any rearrangements. Therefore, the correlations cannot be applied and the coding efficiency is degraded.

Figure 4A:
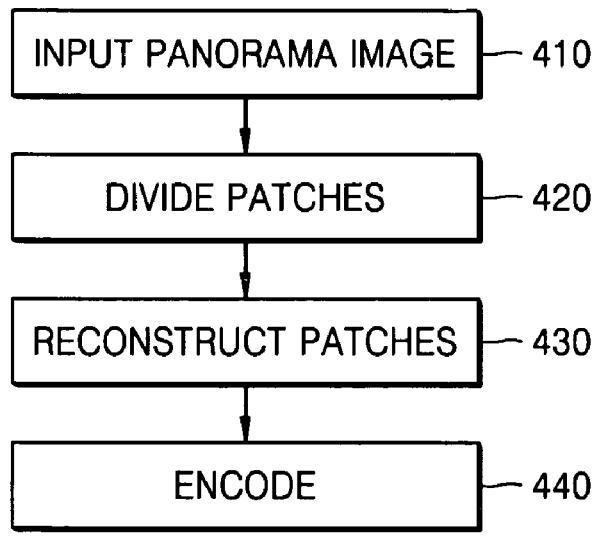
FIGS. 4A and 4B are flowcharts illustrating an encoding process according to an exemplary embodiment of the present invention.

FIG. 4A is a flowchart illustrating an encoding process according to an exemplary embodiment of the present invention.

If an icosahedron panorama image is input to a decoder according to an exemplary embodiment of the present invention in operation 410, the groups of patches forming the top part and the bottom part are divided from the group of patches forming the middle part in operation 420. Then, patches are reconstructed so that patches having a large spatial with each other correlation are disposed adjacent to each other in operation 430, and the reconstructed patches are coded in operation 440. There are a variety of are exemplary methods for constructing patches having a high spatial correlation, which will be described later.

Figure 4B:
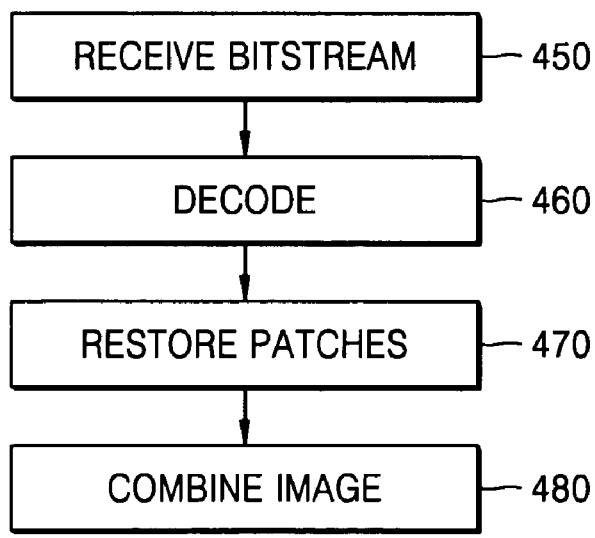

FIG. 4B is a flowchart illustrating a decoding process according to an exemplary embodiment of the present invention. In a decoder, the decoding process is performed in the reverse order of the encoding process. That is, if a bitstream from the encoder is received in operation 450, the received bitstream is decoded to generate patches forming the icosahedron panorama image in operation 460. Since the generated patches are those reconstructed in the encoder as described above, these patches are restored to the original form in operation 470. Finally, by combining the restored top, middle and bottom parts, the development figure of the icosahedron panorama image is constructed in its original form in operation 480.

Figure 5A:
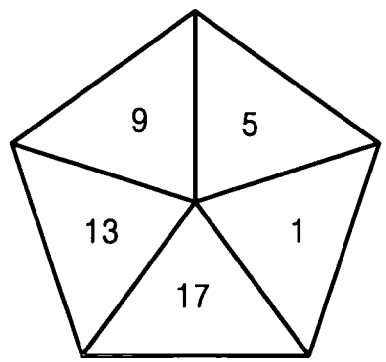
FIGS. 5A through 5D are analytical diagrams of the top part and bottom part of an icosahedron panorama image according to an exemplary embodiment of the present invention.
Figure 5B:
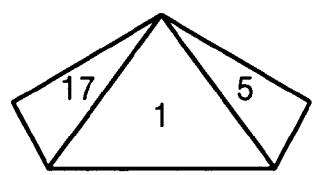

FIGS. 5A and 5B are the plane view and perspective view, respectively, of the top part of an icosahedron.

Figure 5C:
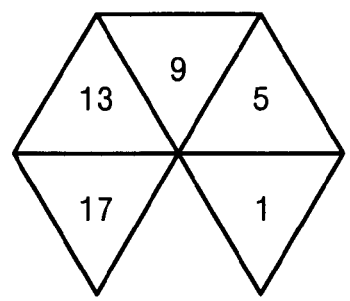
Figure 5D:
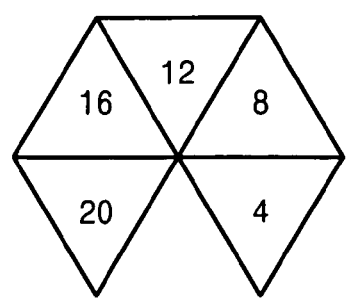

If the top part of an icosahedron is viewed from above, the top is formed with 5 equilateral triangles as shown in FIG. 5A. As previously described, since these triangles are all connected and have high spatial correlations, if these correlations are used when coding is performed, the number of macroblocks is reduced and the coding efficiency can be improved. However, in order to perform coding, image patches should be unfolded on a 2-dimensional plane, and if all patches of the top part are connected, it becomes a cubic shape in a 3-dimensional space as shown in FIG. 5B. FIGS. 5C and 5D are the development figures of the top part and the bottom part, respectively, of an icosahedron panorama image. As described above, connecting all patches of the top part and bottom part is ideal because it can reduce the number of macroblocks on the boundary part. However, since those shapes cannot be unfolded on a 2-dimensional plane, they cannot be coded. Therefore, if they are unfolded on a 2-dimensional plane, the top part has the shape as shown in FIG. 5C, and the bottom part has the shape shown in FIG. 5D.

Figure 6A:
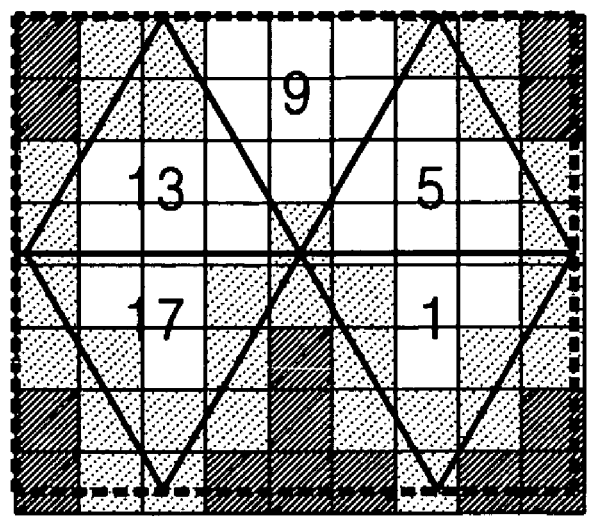
FIGS. 6A and 6B are diagrams illustrating improvements in coding efficiencies in a top part and a bottom part of an icosahedron panorama image as a result of reconstructing patches according to an exemplary embodiment of the present invention.
Figure 6B:
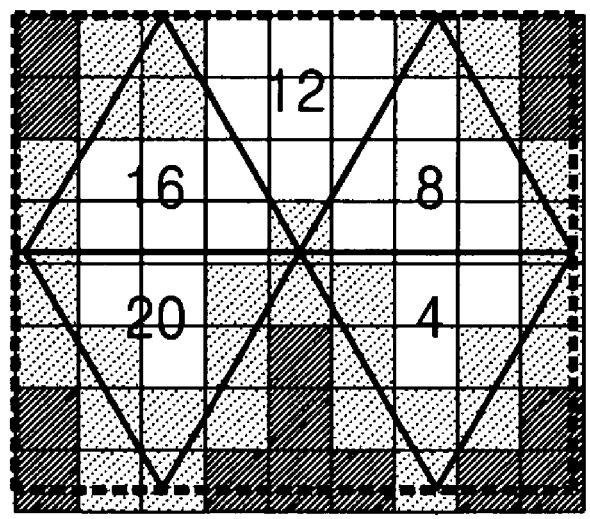

FIGS. 6A and 6B are diagrams illustrating an improvement in coding efficiencies in the top part and bottom part of an icosahedron panorama image as a result of reconstructing patches according to an exemplary embodiment of the present invention.

Figure 2:
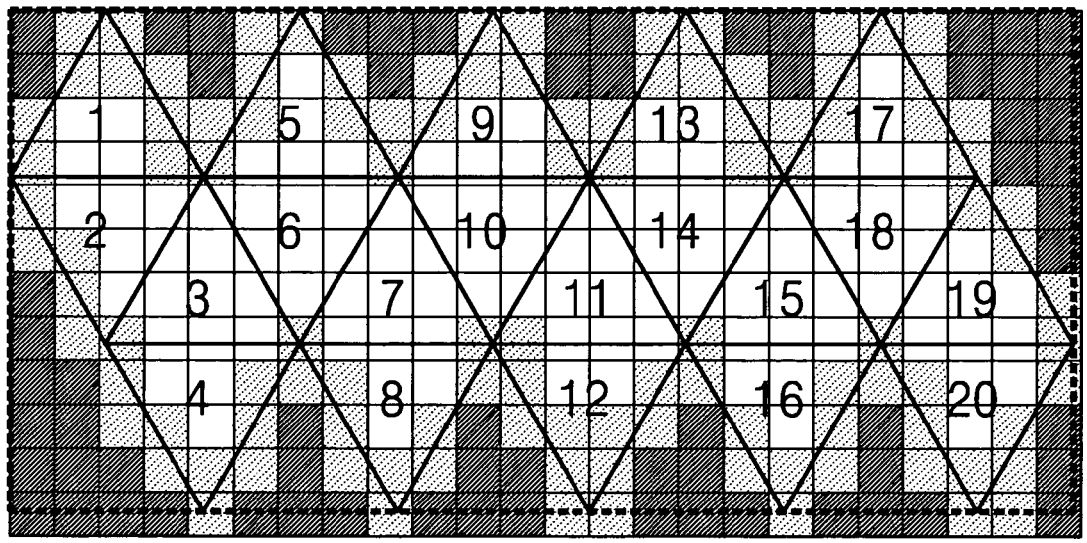
FIG. 2 illustrates a conventional method of coding an icosahedron panorama image.

As shown in FIG. 6A, if only the patches of the top part are unfolded and coded separately according to an exemplary embodiment of the present invention, it can be noted that a number of boundary macroblocks is relatively less than that in FIG. 2. In the case of FIG. 2, the number of boundary macroblocks to be coded in the patches on the top part is 47, but according to the construction of the patches shown in FIG. 6A, the number of boundary macroblocks to be coded is just 32, and the improvement of the coding efficiency can be realized. The same result occurs in the bottom part shown in FIG. 6B.

According to an exemplary embodiment of the present embodiment, though the coding efficiency has improved compared to that in FIG. 2, the correlations between patches 1 and 17 in the case of the top part, and between patches 4 and 20 in case of the bottom part are not applied. Another exemplary embodiment to utilize these correlations will now be described.

Figure 7A:
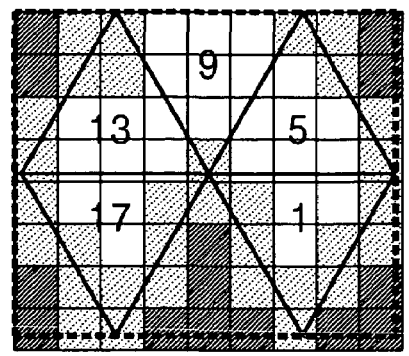
FIGS. 7A and 7B are diagrams illustrating improvements in coding efficiencies in the top part and bottom part of an icosahedron panorama image as a result of reconstructing patches according to another exemplary embodiment of the present invention.
Figure 7A:
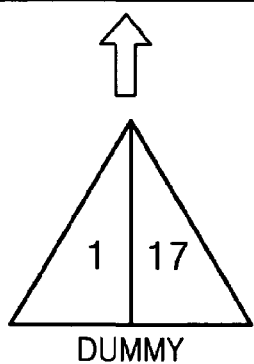
Figure 7B:
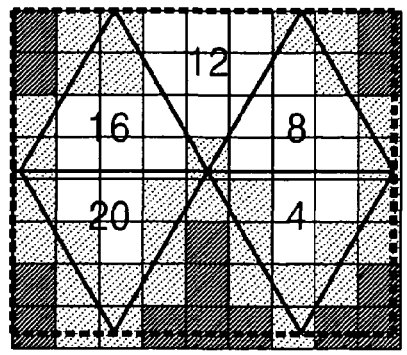
Figure 7B:
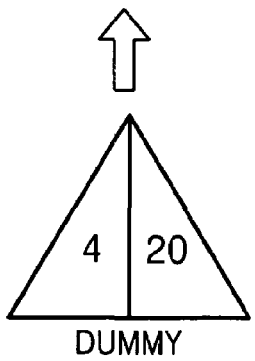

FIGS. 7A and 7B are diagrams illustrating improvements in coding efficiencies in the top part and bottom part of an icosahedron panorama image as a result of reconstructing patches according to another exemplary embodiment of the present invention.

According to this exemplary embodiment of the present invention, by using other patches, dummy patches are generated and then, after inserting the dummy patches, encoding and decoding are performed. When the image is displayed, by using a shape mask, the part corresponding to the dummy patches is removed.

That is, in case of the top part as shown in FIG. 7A, in the half area facing patch 1, the right half of the patch 17, which is 17b is copied and filled, and in the half area facing patch 17, the left half of the patch 1, which is 1a is copied and filled. Then, if encoding and decoding are performed, the number of boundary macroblocks is reduced compared to that in FIG. 6A, as shown in FIG. 7A, such that the coding efficiency can be improved. When compared to FIG. 6A, it can be seen that the number of the boundary macroblocks is reduced to 23 from 47, that is, by more than half. This is applied to the bottom part as shown in FIG. 7B in the same manner. That is, in the bottom part, in the half area facing patch 4, the right half of patch 20, which is 20b is copied and filled, and in the half area facing the patch 20, the left half of the patch 4, which is 4a is copied to generate dummy patches.

Figure 8:
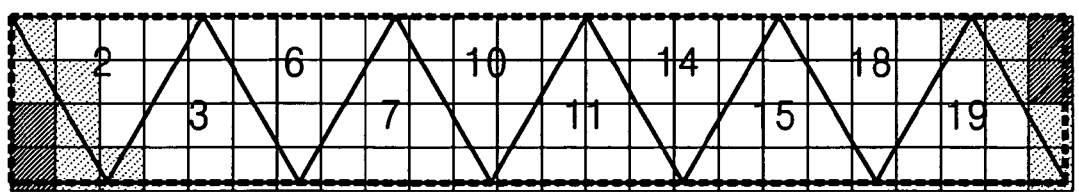
FIGS. 8 is a diagram illustrating an improvement in a coding efficiency in the middle part of an icosahedron panorama image as a result of reconstructing patches according to an exemplary embodiment of the present invention.

FIG. 8 is a diagram illustrating improvement in a coding efficiency in the middle part as a result of reconstructing patches according to an exemplary embodiment of the present invention.

The method of coding the middle part of an icosahedron panorama image according to this exemplary embodiment of the present invention is as follows.

Since there are close correlations among equilateral triangles forming the middle part, in the shape of the long parallelogram as shown in FIG. 8, some boundary macroblocks in the leftmost side and the rightmost side occur, and these boundary blocks can be processed by a 2-dimensional moving picture coding method. However, there is a drawback in that the presence of a high spatial correlation between patches 2 and 19 is not utilized.

Figure 9:
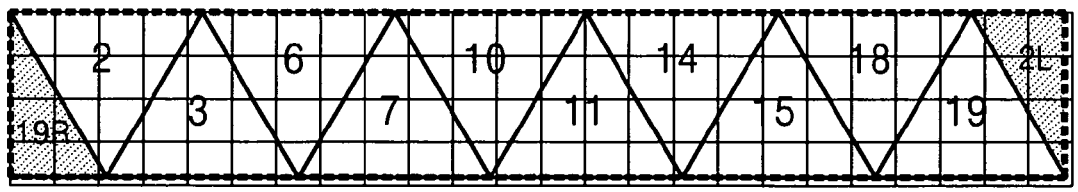
FIG. 9 is a diagram illustrating an improvement in a coding efficiency in the middle part of an icosahedron panorama image as a result of reconstructing patches according to another exemplary embodiment of the present invention.

FIG. 9 is a diagram illustrating an improvement in a coding efficiency in the middle part as a result of reconstructing patches according to another exemplary embodiment of the present invention.

In this exemplary embodiment of the present invention, in order to overcome the drawback that the presence of a high spatial correlation between patches 2 and 19 is not utilized, dummy patches are introduced. That is, in the area to the left of the patch 2, the right half of the patch 19 is copied and filled, and in the area to the right of the patch 19, the left half of the patch 2 is copied and filled. Then coding is completed, by using a frame unit coding method for a rectangle shape.

When the image is displayed, a method of removing the part corresponding to the dummy patches by using a shape mask can be used. According to this exemplary embodiment, the correlation between patches 2 and 19 can be utilized and the boundary macroblocks can be removed such that the coding efficiency can be improved compared to the method of FIG. 8.

Figure 10:
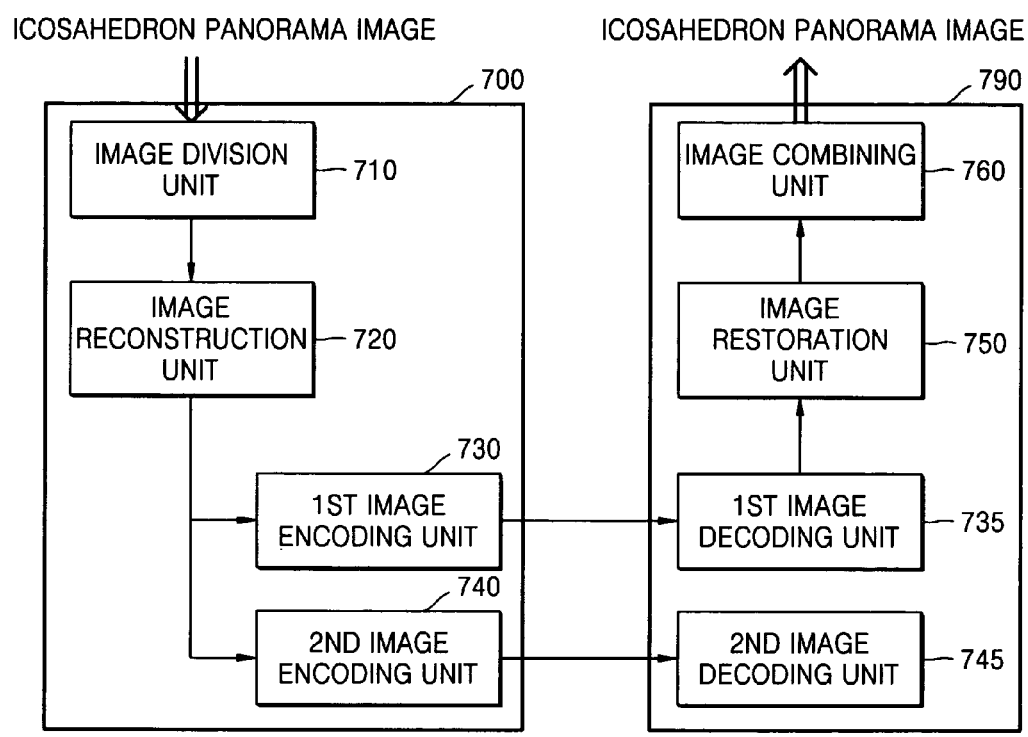
FIG. 10 is a block diagram of an encoder and decoder according to an exemplary embodiment of the present invention.

FIG. 10 is a block diagram of an exemplary encoder 700 and decoder 790 according to an exemplary embodiment of the present invention.

As shown in FIG. 10, the encoder 700 is formed with an image division unit 710, an image reconstruction unit 720, a first image encoding unit 730 and a second image encoding unit 740.

The image division unit 710 divides patches forming the top part and the bottom part, respectively, of the icosahedron in the development figure of the icosahedron image panorama, from patches forming the middle part, and by using the methods described above, the image reconstruction unit 720 reconstructs the equilateral triangular patches divided by the image division unit 710, on a 2-dimensional plane such that patches having a higher correlation are disposed adjacent to each other. The first image encoding unit 730 and the second image encoding unit 740 encode the patches reconstructed by the image reconstruction unit 720. Since the middle part of the panorama image is encoded using an exemplary method different from that for the top and bottom parts, the two encoding units are needed. If the top part and bottom part are encoded separately, then a total of 3 encoding units will be required. In this exemplary embodiment, the patches of the middle part are required to pass through the image reconstruction unit 720. Also, if the patches of the middle part divided from the top and bottom parts are directly encoded without inserting dummy patches, the middle part patches can be directly input to the encoding unit from the image division unit 710. Meanwhile, the decoder 790 comprises an image combining unit 760, an image restoration unit 750, a first image decoding unit 735, and a second image decoding unit 745. The decoder 790 receives a bitstream obtained by encoding the icosahedron panorama image from the encoder 700. The first image decoding unit 735 and the second image decoding unit 745 decode the bitstream and generate patches of the top part, bottom part, and middle part of the icosahedron panorama image reconstructed in the image reconstruction unit 720 of the encoder 700. The image restoration unit 750 restores the patches of the top part, bottom part, and the middle part of the icosahedron panorama image, to the original shape prior to the reconstruction in the image reconstruction unit 720 of the encoder. The image combining unit 760 combines patch groups of the top part, bottom part, and middle part restored by the image restoration unit 750, into the shape of the development figure of the icosahedron prior to the division by the image division unit 710 of the encoder 700.

The exemplary embodiments of the present invention can be written as computer programs and can be implemented in general-use digital computers that execute the programs using a computer readable recording medium. Examples of the computer readable recording medium include magnetic storage media such as read only memory ROM, floppy disks, hard disks, and so on, optical recording media such as compact disc (CD)-ROMs, or digital video discs (DVDs), and storage media such as carrier waves such as transmission through the Internet.

According to embodiments of the present invention, in encoding an icosahedron panorama image, the number of boundary macroblocks having a low coding efficiency can be reduced and at the same time the correlations of patches adjacent in a 3-dimensional space can be used for motion estimation or compensation. Accordingly, a higher coding efficiency than that of the conventional technology can be achieved.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of encoding a polyhedron panorama image formed with polygonal patches, the method comprising:
   reconstructing patches on the boundary of the development figure of the polyhedron panorama image on a 2-dimensional plane such that patches having a high spatial correlation are disposed adjacent to each other; and
   encoding the reconstructed patches.

2. The method of claim 1, wherein the reconstructing of the patches comprises:
   dividing patches forming a top part and a bottom part, respectively, of the development figure of the polyhedron panorama image, from patches forming a middle part; and
   reconstructing the divided patches on a 2-dimensional plane such that patches having a high spatial correlation are disposed adjacent to each other.

3. The method of claim 2, wherein the polyhedron is an icosahedron formed with 20 equilateral triangular patches.

4. The method of claim 3, wherein in reconstructing the divided patches, the 5 patches forming the top part are reconstructed on a 2-dimensional plane such that among 5 sides shared in the icosahedron in a 3-dimensional space, 4 sides are shared.

5. The method of claim 4, further comprising:
   in two patches each sharing only one side with another patch as the result of the reconstruction, copying part of each of the two patches and generating one equilateral triangle patch out of the copied parts such that the side that are shared in the icosahedron in the 3-dimensional space and are not shared in the reconstruction result are included; and
   inserting the generated patch between the patches reconstructed on the 2-dimensional plane such that 5 sides are shared in the same manner as in the icosahedron of the 3-dimensional space.

6. The method of claim 3, wherein in reconstructing the divided patches, the 5 patches forming the bottom part are reconstructed on a 2-dimensional plane such that among 5 sides shared in the icosahedron in a 3-dimensional space, 4 sides are shared.

7. The method of claim 6, further comprising:
   in two patches each sharing only one side with another patch as the result of the reconstruction, copying part of each of two patches and generating one equilateral triangle patch out of the copied parts such that the sides that are shared in the icosahedron in the 3-dimensional space and are not shared in the reconstruction result are included; and inserting the generated patch between the patches reconstructed on the 2-dimensional plane such that 5 sides are shared in the same manner as in the icosahedron of the 3-dimensional space.

8. The method of claim 3, wherein in reconstructing the divided patches, in the development figure of the middle part, the right part of the patch in the rightmost end is copied and inserted such that the part shares one side with the patch in the leftmost end, and the left part of the patch in the leftmost end is copied and inserted such that the part shares one side with the patch in the rightmost end.

9. An apparatus for encoding an icosahedron panorama image formed with polygonal patches, the apparatus comprising:
an image division unit for dividing patches forming a top part and a bottom part, respectively, of the development figure of the icosahedron panorama image, from patches forming a middle part;
an image reconstruction unit for reconstructing the patches divided by the image division unit on a 2-dimensional plane such that patches having a high spatial correlation are disposed adjacent to each other; and
an image encoding unit for encoding the reconstructed patches.

10. The apparatus of claim 9, wherein the polyhedron is an icosahedron formed with 20 equilateral triangular patches.

11. The apparatus of claim 9, wherein the image reconstruction unit reconstructs the 5 patches forming the top part on a 2-dimensional plane such that among 5 sides shared in the icosahedron in a 3-dimensional space, 4 sides are shared.

12. The apparatus of claim 11, wherein in two patches each sharing only one side with another patch as the result of the reconstruction, the image reconstruction unit copies part of each of two patches, generates one equilateral triangle patch out of the copied parts such that the sides that are shared in the icosahedron in the 3-dimensional space and are not shared in the reconstruction result are included, and inserts the generated patch between the patches reconstructed on the 2-dimensional plane such that 5 sides are shared in the same manner as in the icosahedron of the 3-dimensional space.

13. The apparatus of claim 10, wherein the image reconstruction unit reconstructs the 5 patches forming the bottom part on a 2-dimensional plane such that among 5 sides shared in the icosahedron in a 3-dimensional space, 4 sides are shared.

14. The apparatus of claim 13, wherein in two patches each sharing only one side with another patch as the result of the reconstruction, the image reconstruction unit copies part of each of two patches, generates one equilateral triangle patch out of the copied parts such that the sides that are shared in the icosahedron in the 3-dimensional space and are not shared in the reconstruction result are included, and inserts the generated patch between the patches reconstructed on the 2-dimensional plane such that 5 boundary surfaces are shared in the same manner as in the icosahedron of the 3-dimensional space.

15. The apparatus of claim 10, wherein in the development figure of the middle part, the image reconstruction unit copies and inserts the right part of the patch in the rightmost end such that the part shares one side with the patch in the leftmost end, and copies and inserts the left part of the patch in the leftmost end such that the part shares one side with the patch in the rightmost end.

16. A method of decoding an icosahedron panorama image formed with polygonal patches, the method comprising:

receiving and decoding a stream obtained by encoding patches reconstructed such that patches having a high spatial correlation are disposed adjacent to each other;
restoring the patches generated as the result of the decoding, into a shape prior to the reconstruction; and
combining the restored reconstructed patches to generate the development figure of the icosahedron.

17. The method of claim 16, wherein the polyhedron is an icosahedron formed with 20 equilateral triangular patches.

18. The method of claim 17, wherein in the reconstruction, the 5 patches forming a top part of the icosahedron panorama image are reconstructed such that among 5 sides shared in the icosahedron in a 3-dimensional space, 4 sides are shared.

19. The method of claim 18, wherein the reconstruction comprises:
in two patches each sharing only one side with another patch as the result of the reconstruction, copying part of each of two patches and generating one equilateral triangle patch out of the copied parts such that the sides that are shared in the icosahedron in the 3-dimensional space and are not shared in the reconstruction result are included; and
inserting the generated patch between the patches reconstructed on the 2-dimensional plane such that 5 sides are shared in the same manner as in the top part of the icosahedron of the 3-dimensional space.

20. The method of claim 17, wherein in the reconstruction, the 5 patches forming a bottom part are reconstructed on a 2-dimensional plane such that among 5 sides shared in the icosahedron in a 3-dimensional space, 4 sides are shared.

21. The method of claim 20, wherein the reconstruction comprises:
in two patches each sharing only one side with another patch as the result of the reconstruction, copying part of each of two patches and generating one equilateral triangle patch out of the copied parts such that the boundary surface that are shared in the icosahedron in the 3-dimensional space and are not shared in the reconstruction result are included; and
inserting the generated patch between the patches reconstructed on the 2-dimensional plane such that 5 sides are shared in the same manner as in the bottom part of the icosahedron of the 3-dimensional space.

22. The method of claim 17, wherein in the reconstruction, in the development figure of a middle part of the icosahedron panorama image, a right part of the patch in a rightmost end is copied and inserted such that the part shares one side with the patch in a leftmost end, and a left part of the patch in the leftmost end is copied and inserted such that the part shares one side with the patch in the rightmost end.

23. An apparatus for decoding an icosahedron panorama image formed with polygonal patches, the apparatus comprising:
an image decoding unit for receiving and decoding a stream obtained by encoding patches reconstructed such that patches having a high spatial correlation are disposed adjacent to each other;
an image restoration unit for restoring the patches generated as the result of the decoding, into a shape prior to the reconstruction; and
an image combining unit for generating the development figure of the icosahedron, by combining the restored reconstructed patches.

24. The apparatus of claim 23, wherein the polyhedron is an icosahedron formed with 20 equilateral triangular patches.

25. The apparatus of claim 24, wherein in the reconstruction, 5 patches forming a top part of the icosahedron panorama image are reconstructed on a 2-dimensional plane such that among 5 sides shared in the icosahedron in a 3-dimensional space, 4 sides are shared.

26. The apparatus of claim 25, wherein in the reconstruction, in two patches each sharing only one side with another patch as the result of the reconstruction, part of each of two patches is copied and one equilateral triangle patch is generated out of the copied parts such that the sides that are shared in the icosahedron in the 3-dimensional space and are not shared in the reconstruction result are included, and the generated patch is inserted between the patches reconstructed on the 2-dimensional plane such that 5 sides are shared in the same manner as in the bottom part of the icosahedron of the 3-dimensional space.

27. The apparatus of claim 24, wherein in the reconstruction in the development figure of a middle part of the icosahedron panorama image, a right part of the patch in a rightmost end is copied and inserted such that the part shares one side with the patch in a leftmost end, and a left part of the patch in the leftmost end is copied and inserted such that the part shares one side with the patch in the rightmost end.

28. A computer readable recording medium having embodied thereon a set of instructions for executing a method of encoding an icosahedron panorama image formed with polygonal patches, the computer readable recording medium comprises:
a first set of instructions for dividing patches forming a top part and a bottom part, respectively, of the development figure of the icosahedron panorama image, from patches forming the middle part;
a second set of instructions for reconstructing the divided patches on a 2-dimensional plane such that patches having a high spatial correlation are disposed adjacent to each other; and
a third set of instructions for encoding the reconstructed patches.

29. The computer readable recording medium of claim 28, wherein the polyhedron is an icosahedron formed with 20 equilateral triangular patches.

30. A computer readable recording medium having embodied thereon a set of instructions for executing a method of decoding an icosahedron panorama image formed with polygonal patches, the computer readable recording medium comprises:
a first set of instructions for receiving and decoding a stream obtained by encoding patches reconstructed such that patches having a high spatial correlation are disposed adjacent to each other;
a second set of instructions for restoring the patches generated as the result of the decoding, into a shape prior to the reconstruction; and
a third set of instructions for combining the restored reconstructed patches to generate the development figure of the icosahedron.

31. The computer readable recording medium of claim 30, wherein the polyhedron is an icosahedron formed with 20 equilateral triangular patches.

* * * * *